United States Patent
Plazarte et al.

(10) Patent No.: US 9,615,689 B2
(45) Date of Patent: Apr. 11, 2017

(54) FOOD COOKING SYSTEM

(71) Applicant: Sunbeam Products, Inc., Boca Raton, FL (US)

(72) Inventors: Enrique Plazarte, Fort Lauderdale, FL (US); Jason Harris, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 14/717,836

(22) Filed: May 20, 2015

(65) Prior Publication Data

US 2015/0335192 A1 Nov. 26, 2015

Related U.S. Application Data

(60) Provisional application No. 62/000,593, filed on May 20, 2014.

(51) Int. Cl.

| | |
|---|---|
| *A47J 27/62* | (2006.01) |
| *A47J 37/06* | (2006.01) |
| *B21F 7/00* | (2006.01) |
| *A47J 27/10* | (2006.01) |
| *A47J 36/32* | (2006.01) |
| *B65B 31/02* | (2006.01) |
| *B65B 25/22* | (2006.01) |
| *B65B 29/08* | (2006.01) |
| *B65B 31/04* | (2006.01) |
| *B65B 7/06* | (2006.01) |

(52) U.S. Cl.
CPC ............... *A47J 27/10* (2013.01); *A47J 36/32* (2013.01); *B65B 7/06* (2013.01); *B65B 25/22* (2013.01); *B65B 29/08* (2013.01); *B65B 31/02* (2013.01); *B65B 31/047* (2013.01)

(58) Field of Classification Search
CPC .. A47J 27/10; A47J 36/32; B65B 7/06; B65B 25/22; B65B 29/08; B65B 31/02; B65B 31/047
USPC .... 99/330, 331, 332; 366/241, 281; 426/232
See application file for complete search history.

(56) References Cited

U.S. PATENT DOCUMENTS

| | | |
|---|---|---|
| 5,287,680 A | 2/1994 | Lau |
| 5,765,608 A | 6/1998 | Kristen |
| 5,873,217 A | 2/1999 | Smith |
| 7,021,034 B2 | 4/2006 | Higer et al. |
| 7,096,893 B2 | 8/2006 | Vilalta et al. |

(Continued)

*Primary Examiner* — Dana Ross
*Assistant Examiner* — Lindsey C Staubach
(74) *Attorney, Agent, or Firm* — Michael J. Corrigan

(57) ABSTRACT

An appliance including a heating and circulating unit immersed in a pot for cooking food inside a cooking bag immersed in the water. A first recess is formed in a base for storing the heating and circulating unit. A second recess is formed in the base for storing the vacuum packaging unit. A third recess is formed in the base for holding a supply of cooking bags. Prior to cooking food is placed into the cooking bag and evacuated with the vacuum packaging unit. The vacuum packaging unit includes an electronic display and an electronic control panel. An electrical cable connects the vacuum packaging unit and the heating and the circulating unit. The heating and the circulating unit and the vacuum packaging unit are controlled from the electronic control panel and data related to the operation thereof is displayed on the electronic display.

17 Claims, 8 Drawing Sheets

(56) References Cited

U.S. PATENT DOCUMENTS

| | | |
|---|---|---|
| 7,127,875 B2 | 10/2006 | Cheung |
| 7,197,860 B2 | 4/2007 | Hughes et al. |
| 7,197,861 B2 | 4/2007 | Higer et al. |
| 7,272,919 B2 | 9/2007 | Cheung |
| 7,284,361 B2 | 10/2007 | Lau |
| 7,389,629 B2 | 6/2008 | Tretina |
| 7,805,913 B2 | 10/2010 | Alipour et al. |
| 8,096,329 B2 | 1/2012 | Thuot et al. |
| 8,191,469 B2 | 6/2012 | Bergman et al. |
| 8,240,112 B2 | 8/2012 | Binger et al. |
| 8,511,046 B2 | 8/2013 | Felgenhauer |
| 2008/0066624 A1 | 3/2008 | Taylor et al. |
| 2010/0034935 A1* | 2/2010 | Wally .................. A47J 37/00 426/232 |
| 2012/0100273 A1 | 4/2012 | Guillaud |
| 2013/0220143 A1 | 8/2013 | Fetterman et al. |
| 2013/0240500 A1 | 9/2013 | Alipour et al. |
| 2013/0284031 A1 | 10/2013 | Braukmann |
| 2014/0260998 A1* | 9/2014 | Pearson ............... A47J 27/002 99/288 |
| 2015/0040516 A1 | 2/2015 | Torre |
| 2015/0064314 A1 | 3/2015 | Manuel et al. |
| 2015/0082996 A1 | 3/2015 | Wu |
| 2015/0257574 A1* | 9/2015 | Hoare .................. A23L 1/0128 99/342 |
| 2015/0265090 A1* | 9/2015 | Pennella ............... A47J 27/10 426/232 |

* cited by examiner

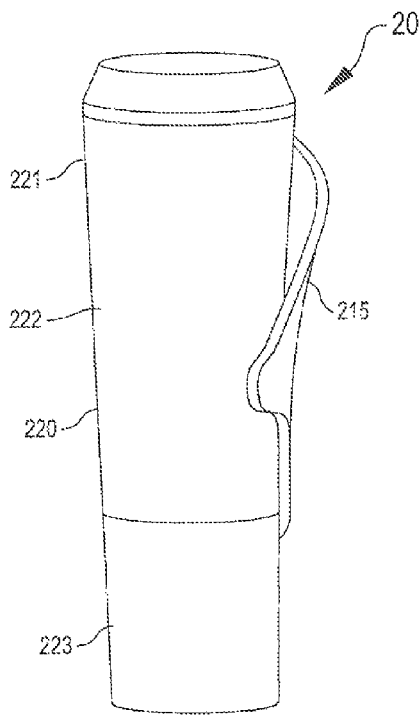
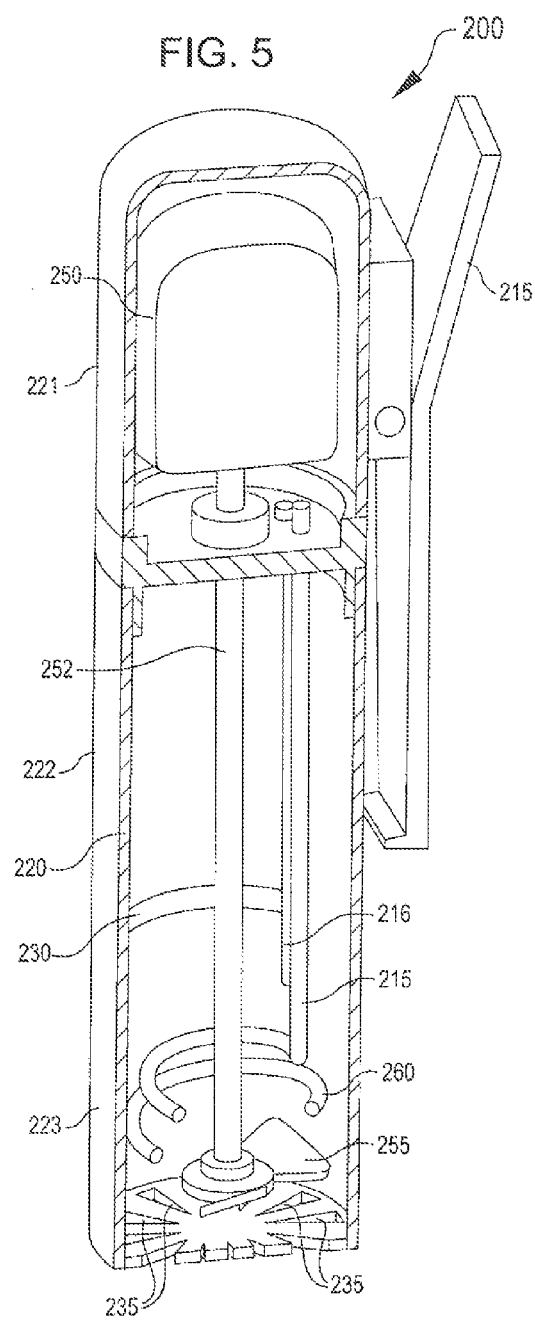

FOOD COOKING SYSTEM

CROSS-REFERENCE TO RELATED APPLICATION

The present application claims benefit of U.S. Provisional Patent Application No. 62/000,593 filed May 20, 2014 entitled "Immersion Circulator With Vacuum Pump".

FIELD OF THE INVENTION

The invention relates to food preparation, and more particularly, to an improved food cooking appliance using a heated water bath in combination with a convenient vacuum packaging machine for vacuum packaging food prior to cooking.

BACKGROUND OF THE INVENTION

Appliances using the sous vide method for slow cooking food using a hot water bath are known. Food desired to be cooked using this method is placed into a food safe bag, evacuated, and sealed. The bag is then immersed into a water bath at a usually much lower than normal cooking temperature for a selected time. There are many advantages of using this method including being able to cook food at a very precise temperature while avoiding overcooking but cooking the food thoroughly and evenly throughout. Many of these appliances are designed as stand-alone units with a large water tank for use on the countertop. Such appliances are bulky and large requiring valuable countertop space. In addition, prior to cooking the food the bag the food is cooked in must be evacuated and sealed prior to cooking. This requires the use of a separate vacuum packaging unit which also takes up valuable countertop space.

In view of the above, it will be apparent to those skilled in the art from this disclosure that there exists a need for an improved food cooking system. This invention addresses this need in the art as well as other needs, which will become apparent to those skilled in the art from this disclosure.

SUMMARY OF THE INVENTION

In an embodiment, there is provided an appliance including a heating and circulating unit configured to be immersed in a volume of water to heat and circulate the water for cooking food inside a bag immersed in the water, a vacuum packaging unit, and a base configured to store the heating and circulating unit and the vacuum packaging unit.

In an embodiment, there is provided a combination food cooking and vacuum packaging appliance including a heating and circulating device configured to be immersed in a pot of water to heat and circulate the water for cooking food inside a cooking bag immersed in the water, a vacuum packaging device for vacuum packaging food in the cooking bag prior to cooking, and a base configured to store the heating and circulating unit and the vacuum packaging unit.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 4 is an enlarged perspective view of the heating and circulating unit of the food cooking system of FIG. 1;

FIG. 5 is a sectional view of the heating and circulating unit of the food cooking system of FIG. 1;

DETAILED DESCRIPTION OF THE INVENTION

Figure 1:
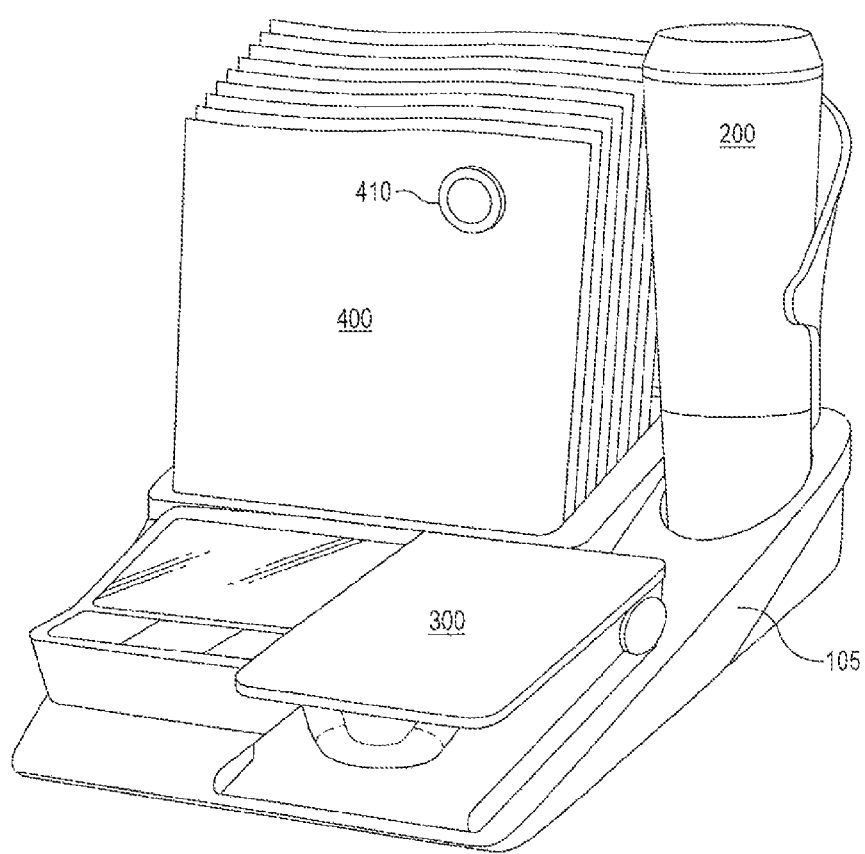
FIG. 1 is a perspective view of an embodiment of a food cooking system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Figure 2:
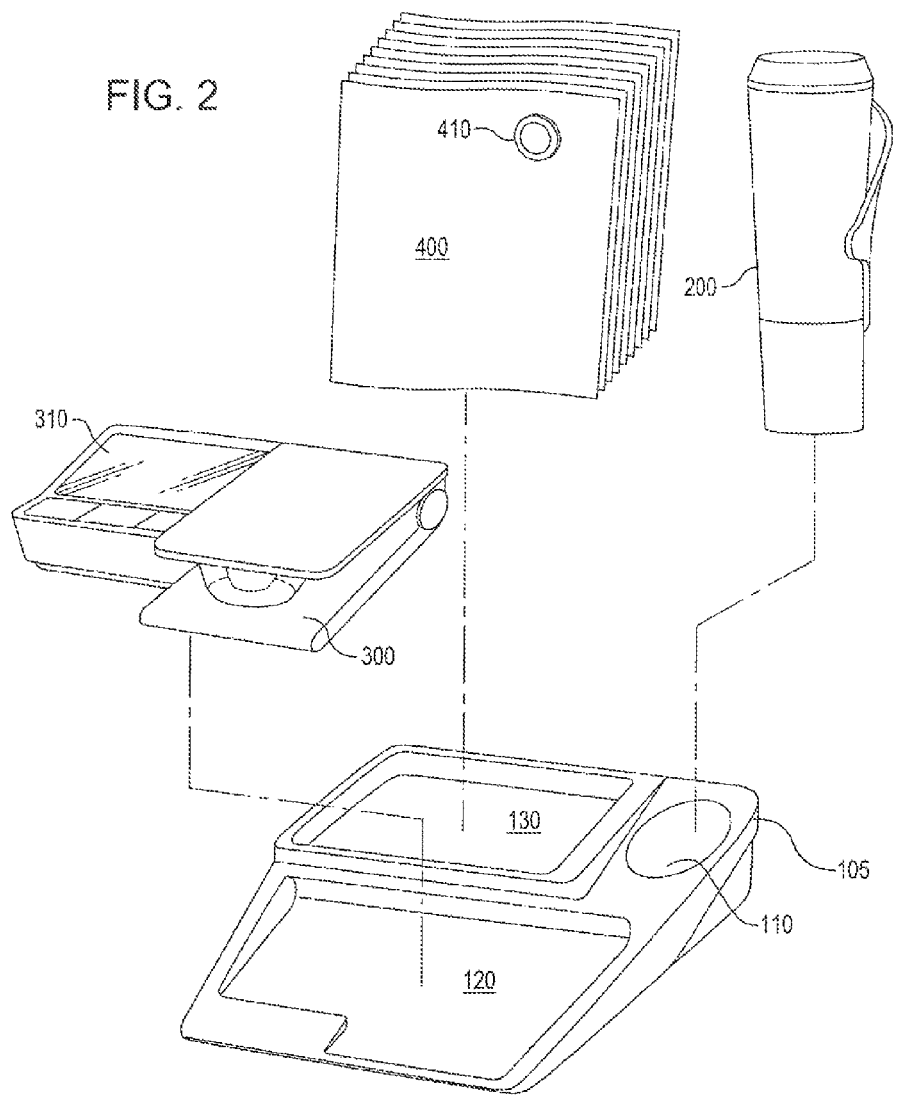
FIG. 2 is an exploded perspective view of the food cooking system of FIG. 1.
Figure 3:
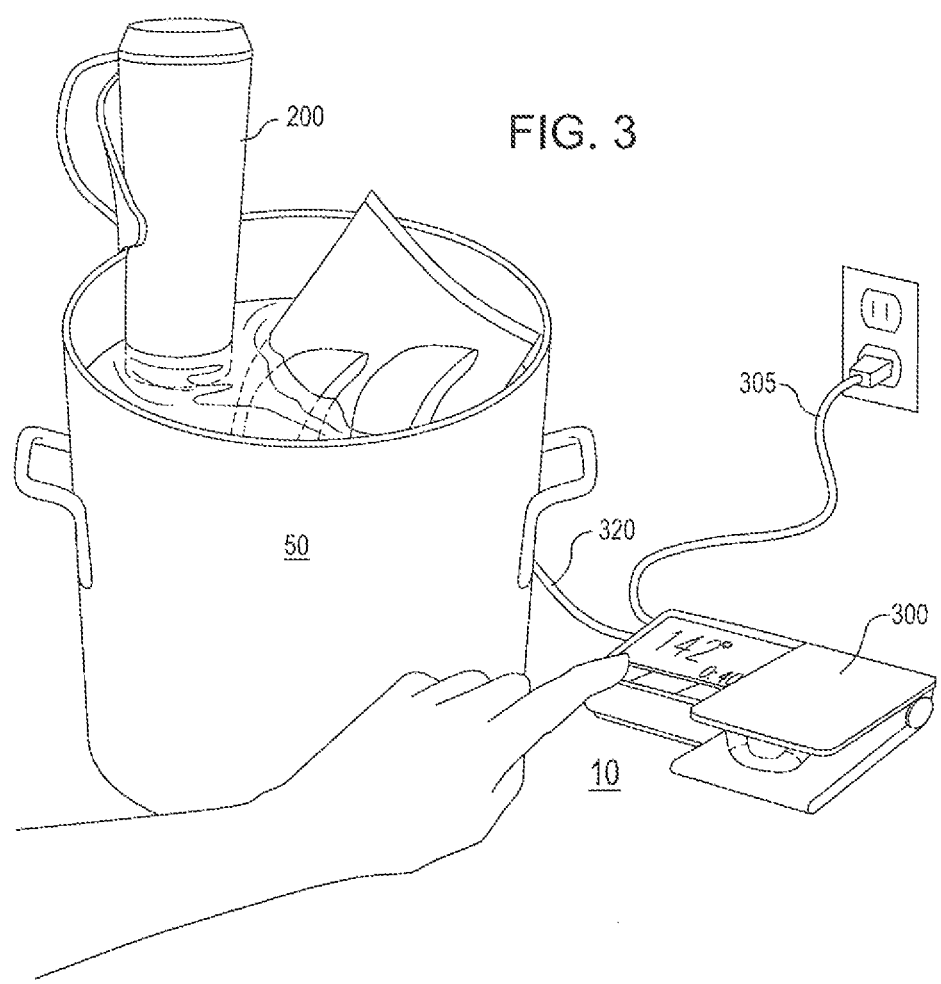
FIG. 3 is a perspective view illustrating the intended use of the heating and circulating unit of the food cooking system of FIG. 1.

Referring now to FIGS. 1-3 of the drawings, in an embodiment there is illustrated an improved food cooking system 100. The system 100 includes a base 105, heating and circulating unit 200, vacuum packaging and control unit 300, and a supply of food cooking bags 400. The base 105 includes a first recess 110 for storing the heating and circulating unit 200, a second recess 120 for storing the vacuum packaging and control unit 300, and a third recess 130 for storing the supply of bags 400.

In an embodiment, the vacuum packaging and control unit 300 is provided electrical power from a conventional source of electrical power via an electrical cal cord 305. In other embodiments, the vacuum packaging and control unit 300 is provided electrical power from other sources of electrical power. The vacuum packaging and control unit 300 has an electronic display 310 for displaying information about the operation of the vacuum packaging and control unit 300 and the heating and circulating unit 200. The heating and circulating unit 200 is electrically connected to the vacuum packaging unit and control 300 via a cable 320. The cable 320 provides electrical power to the heating and circulating unit 200 from the vacuum packaging unit 300 as well as carries electrical signals therebetween representing data. The data concerns the operation of the heating and circulating unit 200 including the temperature of the water used to cook food and the cooking time as described more fully herein below. The vacuum packaging and control unit 300 also includes one or more electronic controls (FIG. 6) for controlling the operation of the vacuum packaging and control unit 300 and the heating and circulating unit 200.

In use, the vacuum packaging unit and control unit 300 and the heating and circulating unit 200 are removed from their respective recesses 110, 120 from the base 105. The heating and circulating unit 200 is inserted into a cooking vessel 50 supported on a surface such as a conventional countertop 10. The cooking vessel 50 may be any type of pot, pan, or vessel capable of holding a quantity of water to be heated. It should be appreciated that it is advantageous that cooking may be performed virtually anywhere and that cooking food with a conventional cooking appliance such as an oven or stove is eliminated. In addition, it should be understood that it is advantageous that any pot or cooking vessel may be used on a surface such as the kitchen countertop 10 since cooking is performed at a much lower temperature than for normal cooking.

Referring now also to FIGS. 4 and 5, in an embodiment the heating and circulating unit 200 may include a housing 220 that defines the shape or form which may be an elongated cylindrical shape. The housing 220 also encloses and supports internally various electrical components including but not limited to an electrical motor 250, impeller 255 rotatably coupled to the electrical motor 250, electrical resistance heater 260, and other electrical or electronic components. The housing 220 and shape can also be various shapes rather than cylindrical in appearance. The housing 220 may be composed of stainless steel or other suitable materials.

The housing 220 may include an upper portion 221, middle portion 222 and a lower portion 223. The upper portion 221 of the housing 220 remains above the water line in the pot 50 and may include a clamp 215 to attach the heating and circulating unit 200 to the sidewall of the pot 50. The lower portion 223 of the housing 220 is immersed below the water line in the pot 50. In an embodiment, the middle portion 222 or the lower portion 223 may be configured with openings 230 through which the unheated water can be drawn from the pot 50 by the impeller 255 disposed within the lower portion 223. The water is heated as it is drawn through the electrical resistance heater 260 in the lower portion 223 and heated water at the selected temperature is discharged from the lower portion 223 back into the pot 50 through openings 235. Note that the openings 230 may be used for discharging heated water from within the housing 200 and the openings 235 may be used as inlets for unheated into the housing 220.

In an embodiment, the middle portion 222 has two adjustable electrodes 215, 216 that perform as a water level sensor S1. The water level sensor S1 is electronically connected to the vacuum packaging unit and control 300 and prevents operation of the electrical motor 250 and the heater 260 unless a pre-determined level of water is sensed in the pot 50.

Figure 6:
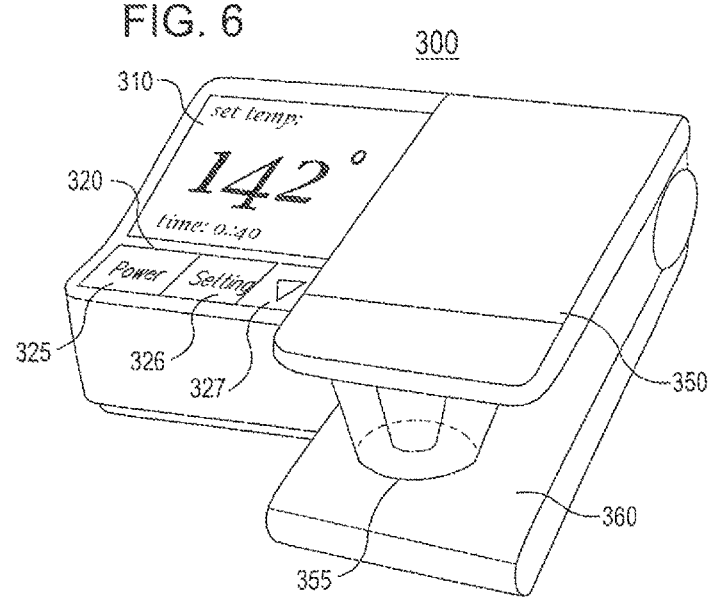
FIG. 6 is an enlarged perspective view of the vacuum packaging and control unit of the food cooking system of FIG. 1.
Figure 7:
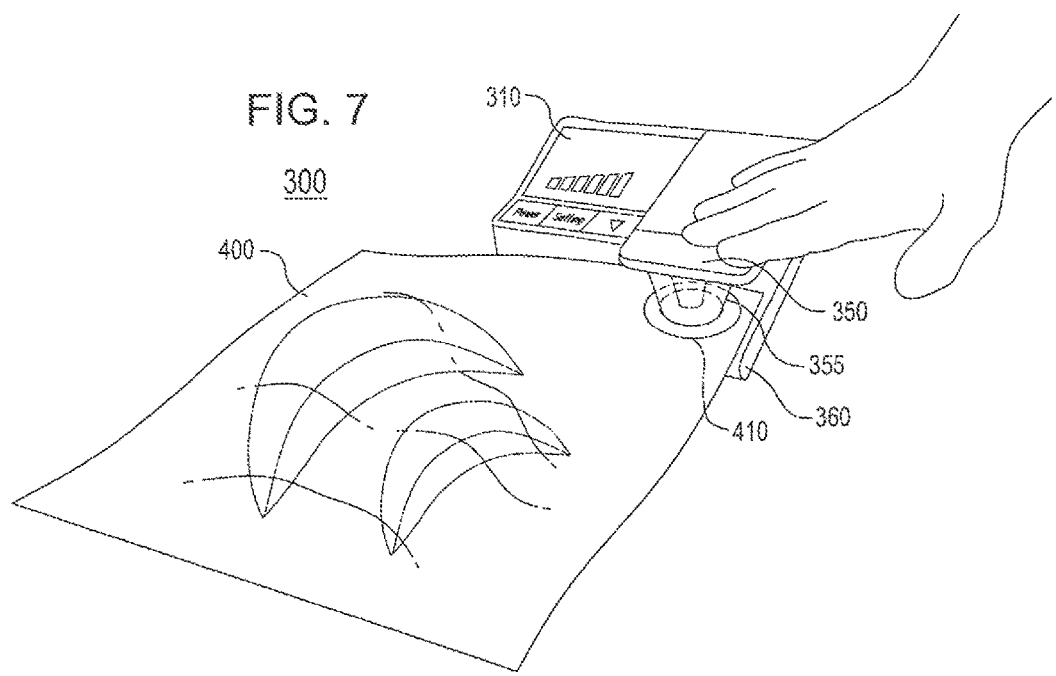
FIG. 7 is an enlarged perspective view illustrating the intended use of the vacuum packaging and control unit of the food cooking system of FIG. 1.

Referring no also to FIGS. 6 and 7, there is illustrated an enlarged view of the vacuum packaging unit and control unit 300 which includes an electronic display 310 which may be an LCD display or other electronic display. The vacuum packaging and control unit 300 also includes a control panel 320 containing a plurality of electronic controls including buttons 325, 326, 327 for controlling operation of the heating and circulating unit 200 and the vacuum packaging unit 300. The vacuum packaging and control unit 300 also includes a hinged lever 350 having a vacuum head 355 attached underneath for engaging with a food cooking bag 400 when depressed. The lever 350 is hingedly connected to a planar base portion 360 and the food cooking bag 400 is sandwiched between the vacuum head 355 and the base portion 360 when the lever 350 is depressed to evacuate the cooking bag 400 as described more fully hereinbelow. Disposed within the housing of the vacuum packaging and control unit 300 is a vacuum motor (not shown) for generating suction for evacuating the cooking bag 400 when the lever 350 is depressed. The display 310 may display that the cooking bag 400 is being evacuated when the lever 350 is depressed.

The plurality of electronic controls including buttons 325, 326, 327 and the electronic display 310 may be electrically connected to a microprocessor MP1 (FIG. 11) mounted on a circuit board PC1 (FIG. 11) disposed within the vacuum packaging and control unit 300. The plurality of electronic controls including buttons 325, 326, 327 provide inputs to microprocessor MP1 (FIG. 11) which contains instructions for executing operations of the heating and circulating unit 200 and the vacuum packaging unit 300.

In an exemplary embodiment, the plurality of electronic controls including buttons 325, 326, 327 are for turning the power to the vacuum packaging and control unit 300 on or off, controlling the current to the heater 260 for maintaining a selected temperature for a selected time in the water bath in the pot 50, controlling the current to the motor 250 in the heating and circulating unit 200 for the selected time, and controlling the current to the vacuum pump (not shown) disposed in the vacuum packaging and control unit 300 for a selected time and a selected vacuum level when the lever 350 is depressed. The selected time the current to the vacuum pump (not shown) is on may correspond to a selected vacuum to be achieved in the cooking bag 400 when the lever 350 is depressed. The electronic display 310 is also electrically connected to the microprocessor MP1 from which it receives signals for displaying information related to the operation of the heating and circulating unit 200 and the vacuum packaging unit 300.

Once the heating and circulating unit 200 is inserted into a bath of water in the pot 50, the cooking temperature is set using one of the plurality of electronic controls 325, 326, 327. As the water bath begins to heat, food to be cooked may be inserted into one of the cooking bags 400. The cooking bag 400 is of the type that is pre-sealed on three sides and has a zipper seal on the remaining side. Food is placed into the interior of the cooking bag 400 and the zipper seal is slid across the open edge to seal the cooking bag 400. A one-way valve 410 is disposed in one of the two sidewalls forming the bag 400 which allows air to be evacuated from within the interior of the bag 400 when the vacuum head 355 is lowered over it and the lever 350 is depressed. Once the interior of the cooking bag 400 has been evacuated, the one-way valve 410 closes and air is prevented from entering the interior of the cooking bag 400. The now evacuated and sealed cooking bag 400 may be inserted into the water bath in pot 50 for cooking the food contained therein. The removal of the air from within the interior of the cooking bag 400 improves heat transfer for improved cooking of the food.

Figure 8:
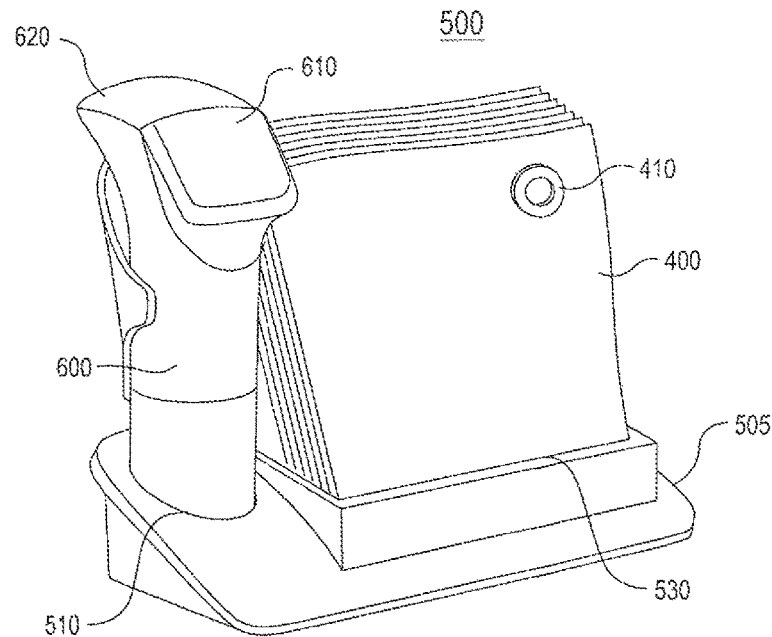
FIG. 8 is a perspective view of another embodiment of a food cooking system.
Figure 9:
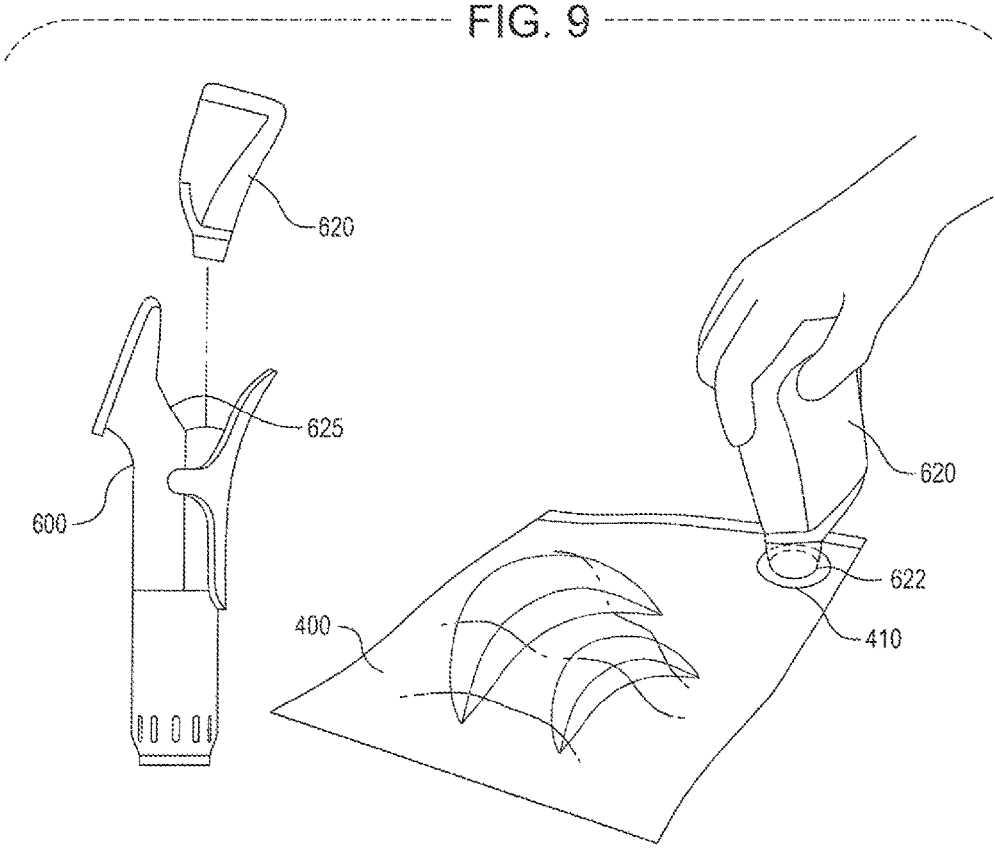
FIG. 9 is a perspective view of the heating and circulating unit of the food cooking system of FIG. 8 with the vacuum packaging unit stored in a pocket therein and an illustration of the intended use of the vacuum packaging unit.

Referring now to FIGS. 8 and 9, there is illustrated an alternate embodiment of an improved food cooking system 500. The system 500 includes a base 505 having a first recess 510 for holding and storing a handheld integrated heating and circulating unit and vacuum packaging unit 600. The base 505 also includes a recess 530 for holding a supply of food cooking bags 400. The integrated heating and circulating unit and vacuum packaging unit 600 may include an electronic display 610 for displaying information related to the operation of the heating and circulating unit and vacuum packaging unit 600. The heating and circulating unit and vacuum packaging unit 600 may include tactile electronic controls (not shown) on the electronic display 610 for operating the heating and circulating unit 600. The heating and circulating unit 600 may include an electrical power cord (not shown) for connection to a conventional source of electrical power or may have an alternate source of electrical power such as batteries. The heating and circulating unit 600 operates similarly to the heating and circulating unit 200 in the previous embodiment except that a handheld vacuum packaging unit 620 is stored in a recess 625 in the upper portion of the heating and circulating unit 600.

Prior to use, the handheld vacuum packaging unit 620 is removed from the recess 625 to evacuate a food cooking bag 400 where an item to be cooked is placed. The suction nozzle 622 of the vacuum packaging unit 620 is placed over a one-way valve 410 in one of the sidewalls of the cooking bag 400 and the vacuum packaging unit 620 is energized. The one-way valve 410 opens when the vacuum packaging unit 620 is energized and air is evacuated from within the interior of the cooking bag 400. After evacuation is complete, the vacuum packaging unit 620 is de-energized releasing the suction on the one-way valve 410 causing it to close preventing air from entering the interior of the cooking bag 400. The handheld vacuum packaging unit 620 may be powered by batteries such as disposable batteries, rechargeable batteries, or other sources of electrical power.

Figure 10:
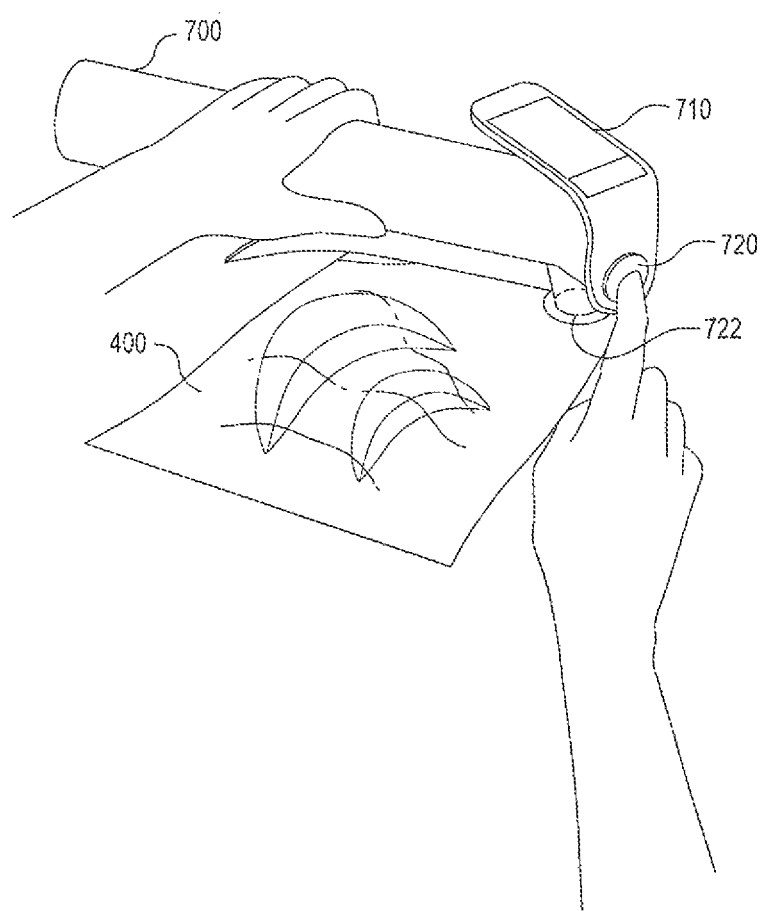
FIG. 10 is a perspective view of another embodiment of the heating and circulating unit for the food cooking system of FIG. 8 with the vacuum packaging unit integrated therein.

Referring now also to FIG. 10, there is illustrated an alternate embodiment of an integrated heating and circulating unit and vacuum packaging unit 700 for use in the improved food cooking and preservation system 500. The heating and circulating unit and vacuum packaging unit 700 operates similarly or identical to the heating and circulating unit and vacuum packaging unit 600 in the previous embodiment except it has the vacuum packaging portion integrated into an upper portion. The heating and circulating unit and vacuum packaging unit 700 includes an electronic display 710 which may include tactile electronic controls (not shown) for operating the heating circulating unit and vacuum packaging unit 700. The integrated vacuum packaging unit in the upper portion may include a suction nozzle 722 which is placed over a one-way valve 410 in one of the sidewalls of the cooking bag 400. The integrated vacuum packaging unit may be energized by an electronic control 720 in the upper portion of the immersion circulating unit 700.

Figure 11:
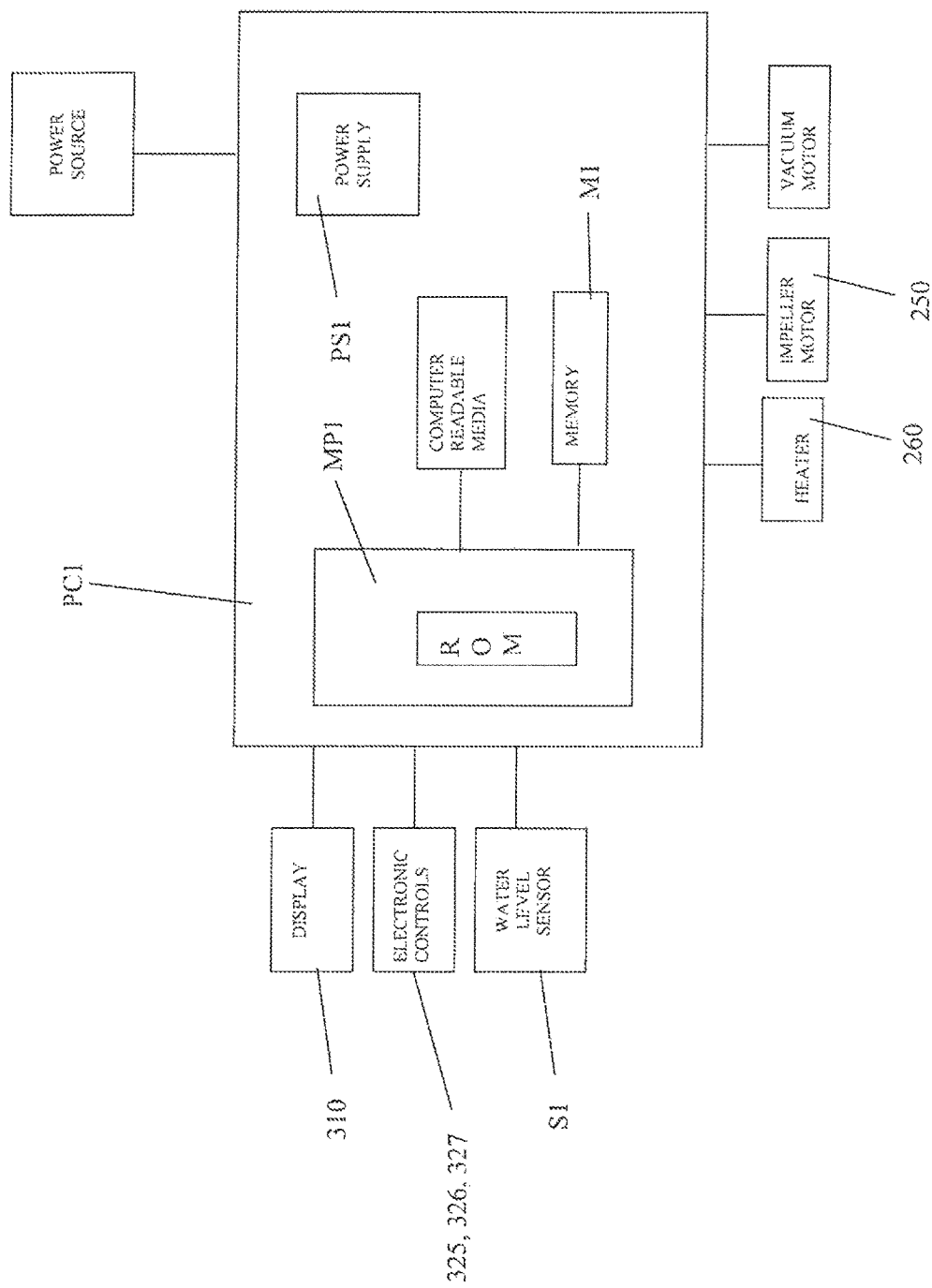
FIG. 11 is a block diagram of the electronic components for the embodiments of the food cooking systems of FIGS. 1 and 8.

Referring now also to FIG. 11, the operative electronic components of the improved food cooking and preservation system 100 and/or the improved food cooking and preservation system 500 may be mounted on a printed circuit board PC1 including a microprocessor MP1. The microprocessor MP1 may include more or less components than those shown in FIG. 11. However, the components shown are sufficient to disclose an illustrative embodiment implementing the present invention. Some or all of the components of the microprocessor MP1 may be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

At least some of the electronic components perform actions involving access to and use of memory M, which can be Read Only Memory ("ROM"), a Random Access Memory ("RAM"), a disk driver and/or a Compact Disc Read Only Memory ("CD-ROM"). Electronic components can include a disk drive unit comprising a computer-readable storage medium on which is stored one or more sets of instructions (e.g., software code) configured to implement one or more of the methodologies, procedures, or functions described herein related to the display 310, electronic controls 325, 326, 327, water level sensor S1, electrical resistance heater 260, the impeller motor 250, and the vacuum motor (not shown) of the vacuum packaging unit 300. The instructions can also reside, completely or at least partially, within the memory M and/or within the microprocessor MP1 during execution. The memory M and the microprocessor MP1 also can constitute machine-readable media. The term "machine-readable media", as used here, refers to a single medium or multiple media (e.g., a centralized or distributed database, and/or associated caches and servers) that store the one or more sets of instructions. The term "machine-readable media", as used here, also refers to any medium that is capable of storing, encoding or carrying a set of instructions for execution by the microprocessor MP1 to perform any one or more of the methodologies of the present disclosure.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. An appliance, comprising:
   a heating and circulating unit configured to be immersed in a volume of water in a container to heat and circulate the water for cooking food inside a bag immersed in the water;
   a vacuum packaging unit, the vacuum packaging unit including an electronic display and an electronic control panel;
   a portable base configured to store the heating and circulating unit and the vacuum packaging unit; and
   an electrical connector connecting the vacuum packaging unit and the heating and circulating unit;
   wherein the electrical connector provides electrical power from the vacuum packaging unit to the heating and circulating unit and carries electrical signals between the electronic control panel and the heating and circulating unit related to the operation of the heating and circulating unit.

2. The appliance of claim 1, further including:
   a first recess formed in the base for removably storing the heating and circulating unit.

3. The appliance of claim 1, further including:
   a second recess formed in the base for removably storing the vacuum packaging unit.

4. The appliance of claim 1, further including:
   a third recess formed in the base for holding a supply of bags.

5. The appliance of claim 1, the electronic control panel further including electronic controls for controlling the operation of the heating and circulating unit including temperature of the water in the container, heating time of the water and circulation of the water.

6. The appliance of claim 1, the electronic control panel further including electronic controls for controlling the operation of the vacuum packaging unit including selecting desired time for evacuating the bag with food contained therein prior to cooking and selecting desired vacuum pressure for the bag for ceasing vacuum operations.

7. The appliance of claim 1, further including displaying on the electronic display data related to the operations of the heating and circulating unit and the vacuum packaging unit.

8. The appliance of claim 1, the heating and circulating unit including a pocket for storing the vacuum packaging unit.

9. The appliance of claim 1, the heating and circulating unit having the vacuum packaging unit integrated therein.

10. A combination food cooking and vacuum packaging appliance, comprising:
    a heating and circulating device configured to be immersed in a pot of water to heat and circulate the water for cooking food inside a cooking bag immersed in the water;
    a vacuum packaging device for vacuum packaging food in the cooking bag prior to cooking;
    a base configured to store the heating and circulating device and the vacuum packaging device; and
    an electrical cable electrically connecting the vacuum packaging device and the heating and circulating device;
    wherein the electrical cable provides electrical power from the vacuum packaging device to the heating and circulating device and carries electrical signals between the electronic control panel and the heating and circulating device related to the operation of the heating and circulating device.

11. The combination food cooking and packaging appliance of claim 10, further including: a first compartment formed in the base for receiving the heating and circulating device.

12. The combination food cooking and packaging appliance of claim 10, further including: a second compartment formed in the base for receiving the vacuum packaging device.

13. The combination food cooking and packaging appliance of claim 10, further including: a third compartment formed in the base for holding a supply of cooking bags.

14. The combination food cooking and packaging appliance of claim 13, further including displaying on the electronic display data related to the operations of the heating and circulating device and the vacuum packaging device.

15. The combination food cooking and packaging appliance of claim 10, the vacuum packaging device including an electronic display and an electronic control panel.

16. The combination food cooking and packaging appliance of claim 15, the electronic control panel further including electronic controls for controlling the operation of the heating and circulating device including temperature of the water in the pot, heating time of the water and circulation of the water.

17. The combination food cooking and packaging appliance of claim 15, the electronic control panel further including electronic controls for controlling the operation of the vacuum packaging device including selecting desired time for evacuating the cooking bag with food contained therein prior to cooking and selecting desired vacuum pressure in the cooking bag for ceasing vacuum operations.

* * * * *